United States Patent
Isaji et al.

(10) Patent No.: US 7,788,033 B2
(45) Date of Patent: Aug. 31, 2010

(54) COLLISION POSSIBILITY DETERMINING DEVICE

(75) Inventors: Kazuyoshi Isaji, Kariya (JP); Naohiko Tsuru, Handa (JP)

(73) Assignee: DENSO CORPORATION, Kariya-city (JP)

( * ) Notice: Subject to any disclaimer, the term of this patent is extended or adjusted under 35 U.S.C. 154(b) by 1107 days.

(21) Appl. No.: 10/950,383

(22) Filed: Sep. 28, 2004

(65) Prior Publication Data

US 2005/0090983 A1    Apr. 28, 2005

(30) Foreign Application Priority Data

Oct. 28, 2003    (JP) .............................. 2003-367902

(51) Int. Cl.
G06F 17/10    (2006.01)
G08G 1/16    (2006.01)

(52) U.S. Cl. ...................... 701/301; 340/903; 382/103; 342/70; 348/113

(58) Field of Classification Search ................. 701/301; 340/903; 382/103; 342/70; 348/113
See application file for complete search history.

(56) References Cited

U.S. PATENT DOCUMENTS

| | | | | |
|---|---|---|---|---|
| 5,053,979 | A * | 10/1991 | Etoh | 700/304 |
| 6,169,572 | B1 * | 1/2001 | Sogawa | 348/113 |
| 6,327,536 | B1 * | 12/2001 | Tsuji et al. | 701/301 |
| 6,338,022 | B1 * | 1/2002 | Shinmura et al. | 701/301 |
| 6,593,873 | B2 * | 7/2003 | Samukawa et al. | 342/70 |
| 6,714,139 | B2 * | 3/2004 | Saito et al. | 340/903 |
| 6,774,772 | B2 * | 8/2004 | Hahn | 340/439 |
| 6,776,436 | B2 * | 8/2004 | Takagi et al. | 280/735 |
| 6,810,132 | B1 * | 10/2004 | Umezaki et al. | 382/104 |
| 6,816,084 | B2 * | 11/2004 | Stein | 340/903 |
| 6,917,305 | B2 * | 7/2005 | King | 340/903 |
| 7,046,822 | B1 * | 5/2006 | Knoeppel et al. | 382/103 |
| 2001/0012982 | A1 | 8/2001 | Ogura et al. | |
| 2001/0036293 | A1 * | 11/2001 | Laumeyer et al. | 382/104 |

(Continued)

FOREIGN PATENT DOCUMENTS

JP    A-H11-139229    5/1999

(Continued)

OTHER PUBLICATIONS

Search Report from French Patent Office issued on Nov. 8, 2006 for the corresponding French patent application No. FR 0411465.

(Continued)

*Primary Examiner*—Khoi Tran
*Assistant Examiner*—Ian Jen
(74) *Attorney, Agent, or Firm*—Posz Law Group, PLC (57) ABSTRACT

A collision possibility determining unit determines that a subject vehicle has possibility of colliding with a certain vehicle when both the following two determinations are fulfilled. The first determination is that the traveling state of the subject vehicle is proper. The second determination is that a relative position between the subject vehicle and the certain vehicle continues to be maintained at the same relationship for a given period. When the collision possibility is determined to be existing, an alarm generating unit generates an alarm that arouses driver's attention. Thus, collision possibility is determined based on the relative position relationship with another vehicle, so that an alarm relating to another vehicle as an obstacle can be generated at a proper timing.

18 Claims, 7 Drawing Sheets

U.S. PATENT DOCUMENTS

2002/0019697 A1* 2/2002 Cong et al. .................. 701/207
2003/0099377 A1* 5/2003 Hanawa ...................... 382/104

FOREIGN PATENT DOCUMENTS

| JP | A-11-242799 | 9/1999 |
| JP | A-2001-093091 | 4/2001 |
| JP | A-2004-302621 | 10/2004 |
| JP | A-2005-078265 | 3/2005 |

OTHER PUBLICATIONS

Notice of Reason for Rejection from Japanese Patent Office issued on Jan. 9, 2007 for the corresponding Japanese patent application No. 2003-3679002.

* cited by examiner

COLLISION POSSIBILITY DETERMINING DEVICE

CROSS REFERENCE TO RELATED APPLICATIONS

This application is based on and incorporates herein by reference Japanese Patent Application No. 2003-367902 filed on Oct. 28, 2003.

FIELD OF THE INVENTION

The present invention relates to a collision possibility determining device.

BACKGROUND OF THE INVENTION

Conventionally, an alarming device this mounted in a subject vehicle and generates an alarm relating to an obstacle based on an expectation result is proposed (e.g., JP-H11-139229 A). In this alarming device, position data of an obstacle includes a relative distance and relative orientation between the subject vehicle and the obstacle, and a size of the object and is memorized. In consideration of the preceding behavior of the obstacle using its position data, the subsequent behavior of the obstacle is expected. An alarm relating to the obstacle is then generated based on the expectation result.

The above alarming device obtains position data every a single obstacle even when multiple obstacles are present. When many obstacles are present, it is supposed that obtaining the position data relating to many obstacles needs a long time. In this case, an alarm is possibly not generated at a proper timing.

SUMMARY OF THE INVENTION

It is an object of the present invention to provide a collision possibility determining device that properly generates a warning relating to an obstacle at a proper timing.

To achieve the above object, a collision possibility determining device mounted in a subject vehicle is provided with the following. Whether a traveling state of the subject vehicle is proper or not is determined based on a position of the subject vehicle in a vehicle-width direction within a traveling lane or a relative relationship with a preceding vehicle. A vehicle that is positioned forward of the subject vehicle is detected. Whether a relative position relationship with a certain vehicle is continuously maintained for a given period is determined when the traveling state of the subject vehicle is determined to be proper. Here, the certain vehicle excludes the preceding vehicle and is included in the vehicle detected forward of the subject vehicle. Whether possibility of a collision between the subject vehicle and the certain vehicle exists or not is determined based on whether the relative position relationship with the certain vehicle is continuously maintained for the given period.

It has been reported that a collision occurs between vehicles just after entering in a clearly-viewed intersection. When two intersecting vehicles are entering an intersection in approximately equal speeds, a relative position between them does not change. The drivers of the two vehicles thereby observe the mutual counterpart vehicles almost stopping, so that the drivers of the two vehicles eventually enter the intersection without recognizing the existence of the counterpart vehicles, respectively.

The present invention determines collision possibility in undergoing a peculiar phenomenon that takes place in the above-described clearly-viewed intersection. Namely, when a traveling state of a subject vehicle is proper, whether the above-described peculiar phenomenon occurs is determined by whether a relative position between the subject vehicle and a certain vehicle continues to be not changing for a given period.

In this structure, even when there are many obstacles, various data relating to the obstacles that expects behaviors of the multiple obstacles does not need obtaining nor memorizing. Whether possibility of a collision with a certain vehicle that looks almost stopping in a driver's vision exists or not is determined based on a relative position relationship between the subject vehicle and the certain vehicle. This enables a warning relating to the certain vehicle as an obstacle to be generated at a proper timing even when many vehicles are present.

In another aspect of the present invention, a collision possibility determining device mounted in a subject vehicle is provided with the following. This collision possibility determining device determines possibility of a collision with an oncoming vehicle that is positioned forward of the subject vehicle and travels in a lane opposite to the traveling lane of the subject vehicle. Here, whether a portion constituting a side of the oncoming vehicle is extracted is determined when the traveling state of the subject vehicle is determined to be proper. Whether possibility of a collision between the subject vehicle and the oncoming vehicle exists or not is determined based on whether the portion constituting the side of the oncoming vehicle is extracted.

A portion (e.g., a rear wheel) constituting a side of an oncoming vehicle can be seen when the oncoming vehicle properly travels at the traveling direction in the opposite lane. In contrast, when an oncoming vehicle deviates from its traveling lane to approach towards the subject vehicle, the portion constituting the side of the vehicle becomes invisible. The present invention recognizes the importance in this point. Namely, without obtaining data relating to a distance to the oncoming vehicle, a size or orientation of the oncoming vehicle, etc., possibility of a collision with the oncoming vehicle can be determined.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A collision possibility device of the present invention will be explained below based on drawings. In embodiments, the collision possibility device is directed to a function of a drive assisting device that assists driving a vehicle.

First Embodiment

Figure 1:
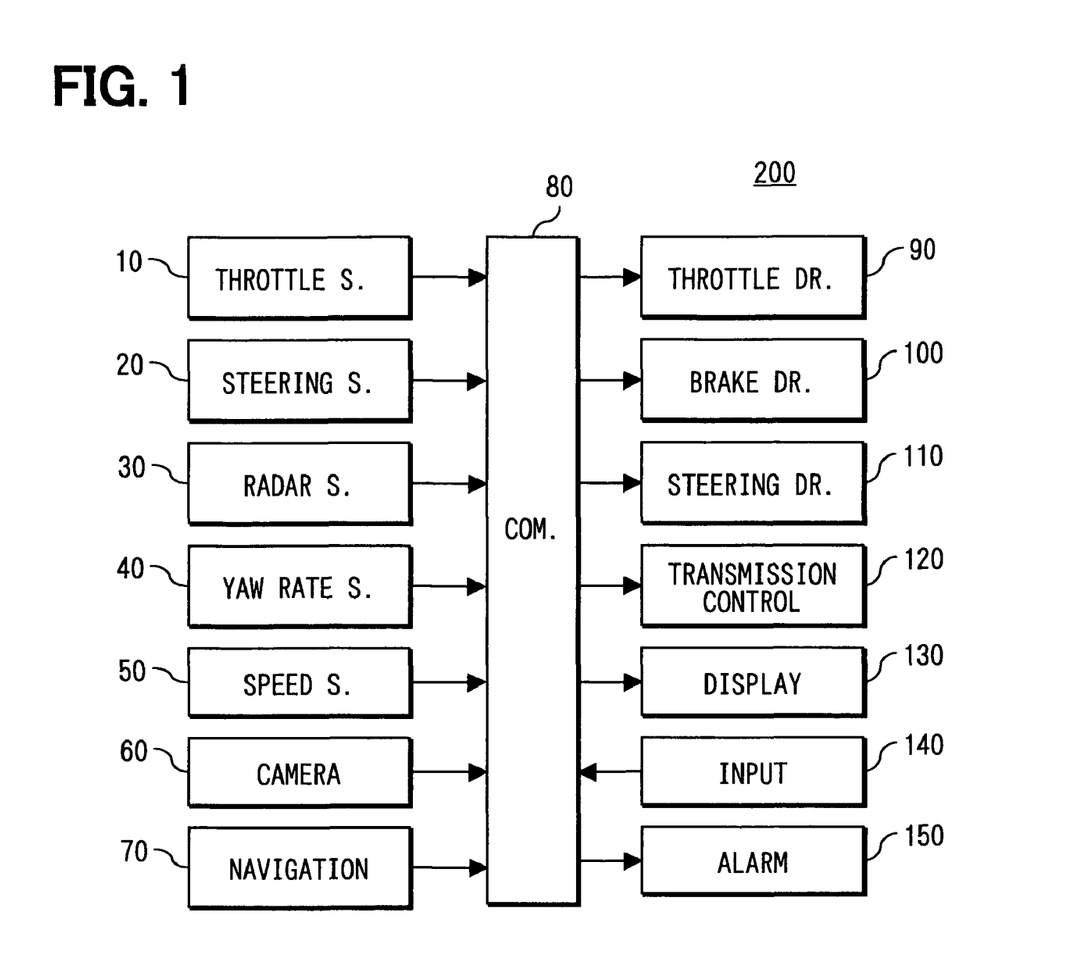
FIG. 1 is a block diagram showing an overall structure of a drive assisting device according to an embodiment of the present invention.

A drive assisting device 200 shown in FIG. 1 includes: a throttle angle sensor 10; a steering sensor 20; a laser radar sensor 30; a yaw rate sensor 40; a vehicle speed sensor 50; a CCD camera 60; and a navigation unit 70, which are connected with a computer 80.

Further, the drive assisting device 200 includes: a throttle driving unit 90; a brake driving unit 100; a steering driving unit 110; an automatic transmission control unit 120; a display unit 130; an input unit 140; and an alarm unit 150, which are also connected with the computer 80.

The computer 80 includes an input/output interface (not shown) and various driving circuits. The structure of the hardware is known, so that explanation is removed. The computer 80 determines collision possibility with another vehicle around the subject vehicle based on information from the various sensors. When the collision possibility is determined to be existing from a result of this determination, the computer 80 then executes an alarm generating process that arouses a driver's attention through the display unit 130 or the alarm unit 150.

The computer 80 executes a drive assisting process that assists driving operation such as a lane keeping control that causes the subject vehicle to keep a traveling lane and a following distance control that causes the subject vehicle to keep a period between the subject vehicle and a preceding vehicle that travels in a traveling direction equal to a traveling direction in which the subject vehicle travels (i.e., the preceding vehicle is ahead of the subject vehicle and travels to the same traveling direction as that of the subject vehicle). The drive assisting process is executed by driving the throttle driving unit 90, the brake driving unit 100, the steering driving unit 110, the automatic transmission control unit 120, etc. based on information from the respective sensors.

The throttle angle sensor 10 detects an opening angle of a throttle valve, which is sent to the computer 80. The steering sensor 20 detects a variation amount of a steering angle of a steering wheel to thereby detect a relative steering angle from the detected variation amount.

The laser radar sensor 30 radiates laser light within a certain range forward of the vehicle, thereby detecting a distance, relative speed, and relative orientation with a reflecting object that reflects the radiated laser. A result of the detection is converted to an electrical signal and outputted to the computer 80. The laser radar 30 detects an object using laser light; however, it can use ultrasonic waves or radio waves such as milli-meter waves or microwaves instead.

The yaw rate sensor 40 detects an angular speed around a plumb line (or vertical line) of the vehicle. The vehicle speed sensor 50 detects a signal corresponding to a rotation speed of a wheel. The CCD camera 60 is an optical type camera used as an imaging unit that takes an image of a view within a given region forward of the vehicle, converting the taken image to an electrical signal to send it to the computer 80.

The navigation unit 70 executes various functions such as a map display function that displays a map surrounding a vehicle's current position, as known, including a map data input unit for inputting map data for displaying a map and a GPS (Global Positioning System) receiver detecting a vehicle's current position based on radio waves from GPS satellites.

The throttle driving unit 90, the brake driving unit 100, the steering driving unit 110, the automatic transmission control unit 120 are individually driven based on a command from the computer 80. The throttle driving unit 90 controls an opening of a throttle valve to control output of an internal combustion engine. The brake driving unit 100 controls a brake pressure, while the steering driving unit 110 drives a steering by generating a rotation torque on the steering. The automatic transmission control unit 120 selects a gear position of an automatic transmission that is necessary for controlling a vehicle speed.

The display unit 130 is constructed of, e.g., a crystal display and disposed around a center console. The display unit 130 is inputted image data for displaying a map outputted from the navigation unit 70 or image data for displaying a warning notice to arouse a driver's attention that is outputted from the computer 80. The display unit 130 thereby displays images corresponding to the individual image data.

The input unit 140 is, e.g., a touch switch integrated into the display unit 130 or a mechanical switch used in inputting characters or the like. The alarm unit 150 generates an alarming sound for arousing driver's attention, outputting an alarm according to a command from the computer 80.

As explained above, the computer 80 determines collision possibility with another vehicle around the subject vehicle based on information from the various sensors. When the collision possibility is determined to be existing from a result of this determination, the computer 80 then executes an alarm generating process that arouses a driver's attention through the display unit 130 or the alarm unit 150.

Figure 2:
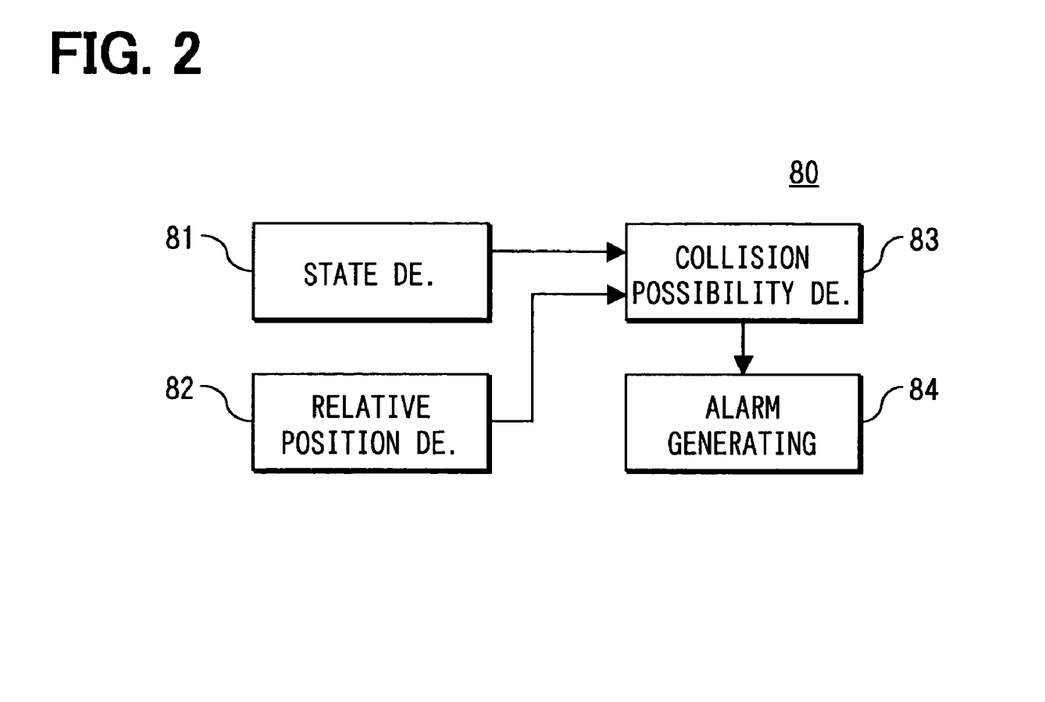
FIG. 2 is a block diagram showing control of a computer according to a first embodiment of the present invention.

In FIG. 2, a block diagram of control of the computer 80 is shown. Here, a traveling state determining unit 81 determines whether a traveling state of the subject vehicle is proper, i.e., whether the subject vehicle travels within a traveling lane (regarding a vehicle-width direction) and with a proper following time with a preceding vehicle. A result from the determination is sent to a collision possibility determining unit 83 every a given period (e.g., several hundred milli-seconds). This determination is executed based on a following distance or relative speed with the preceding vehicle detected by the laser radar sensor 30; or a lane that indicates a traveling division of a road that is taken by the CCD camera 60.

A relative position determining unit 82 detects, from an image taken by the CCD camera 60, a position (e.g., central position) of a certain vehicle that exists around the subject vehicle but excludes the preceding vehicle, such as a vehicle that is to intersect with the subject vehicle. The relative position determining unit 82 then determines whether the detected position of the certain vehicle remains at an approximately equal position within the image for a given period, and sends a result of the determination to the collision possibility determining unit 83.

The collision possibility determining unit 83 determines whether collision possibility exists or not based on the determination result relating to the traveling state of the subject vehicle from the traveling state determining unit 81 and the determination result relating to the relative position relationship with the certain vehicle from the relative position determining unit 82. The collision possibility determining unit 83 determines collision possibility of a collision with the certain vehicle in an intersection or the like that can be clearly viewed.

It has been reported that a collision occurs suddenly between intersecting vehicles after the intersecting vehicles enter in a clearly-viewed intersection. When two intersecting vehicles are entering an intersection in approximately equal speeds, a relative position does not change. The drivers of the two vehicles thereby observe the mutual counterpart vehicles almost stopping, so that the two vehicles eventually enter the intersection without recognizing the existence of the counterpart vehicles, respectively.

Figure 3:
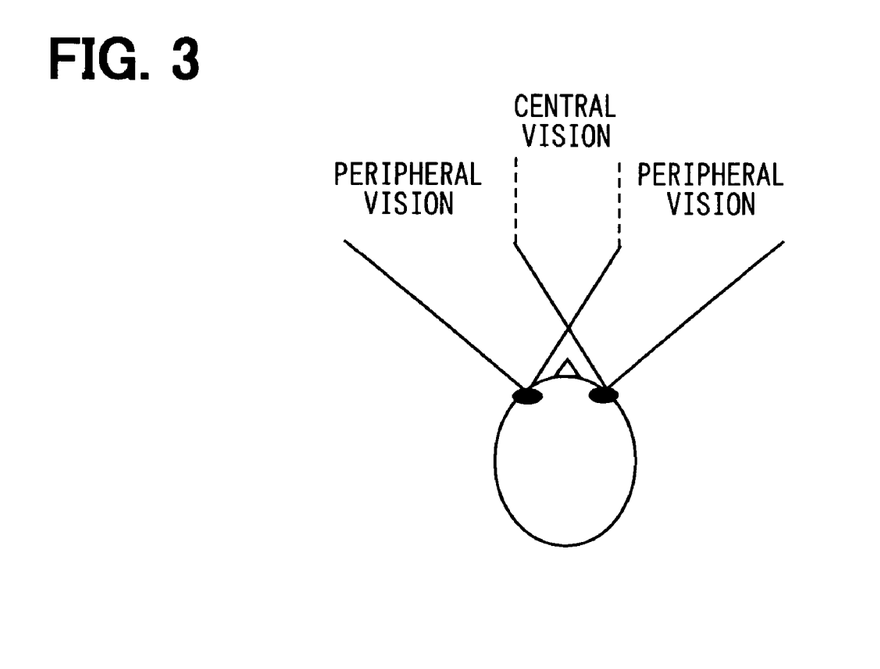
FIG. 3 is an imaginary view showing a viewing field of a person according to the first embodiment.

This peculiar phenomenon that takes place in a clearly-viewed intersection results primarily from a characteristic of vision recognition of a person. A viewing field of a person is shown in FIG. 3. The person's vision is basically divided into a central vision and a peripheral vision. Recognition capability is differentiated in both the visions.

Namely, generally, a person can recognize what an object existing in the central vision is; by contrast, the person cannot easily recognize what an object existing in the peripheral vision is. Further, this tendency seen in the peripheral vision is strengthened as the vision departs from the central vision. Here, when an object in the peripheral vision moves, the object (or existence of the object) can be recognized. The object can be thereby then recognized by the central vision of the person.

This peculiar phenomenon that takes place in a clearly-viewed intersection results from the situation where the mutual counterpart vehicles falling within the peripheral visions seem to be not moving when the two vehicles are advancing into an intersection in approximately equal speeds. This will be explained with reference to FIGS. 4A, 4B.

Figure 4A:
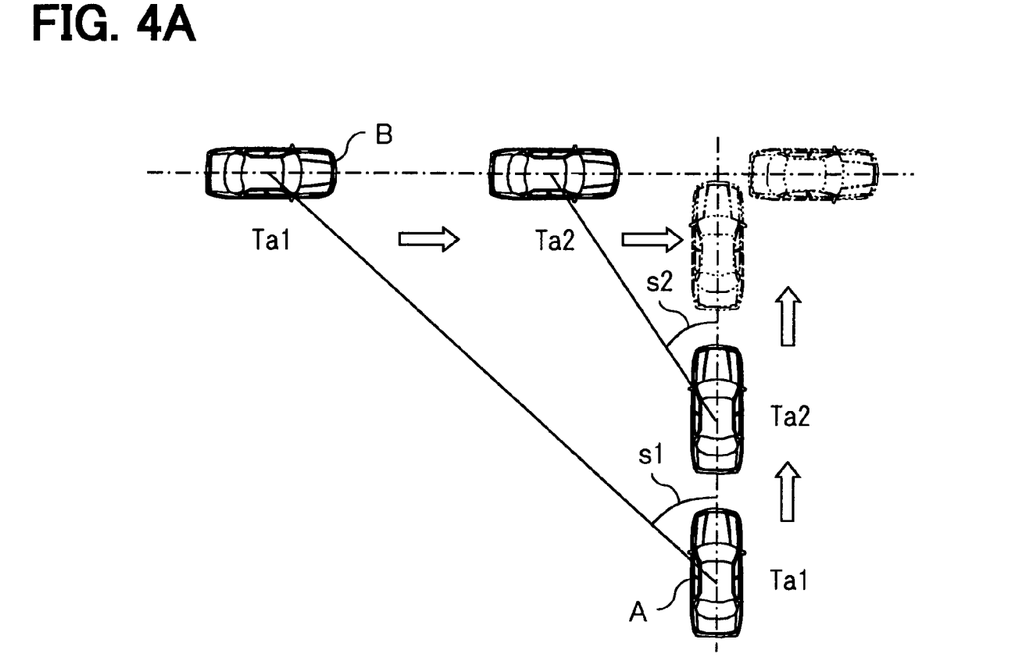
FIG. 4A is an imaginary view of a vehicle A and a vehicle B that are to enter an intersection and have different vehicle speeds from each other.

FIG. 4A shows an imaginary view including an intersecting vehicle A and an intersecting vehicle B that are entering an intersection. When the intersecting vehicle A and the intersecting vehicle B have different vehicle speeds from each other, relative positions between the two vehicles A, B at Ta1 and Ta2 are different from each other. In other words, an orientation of the intersecting vehicle B relative to a traveling direction of the intersecting vehicle A is changed from an orientation S1 to an orientation S2. It is supposed that, while the driver of the vehicle A or vehicle B gazes forward at a traveling direction, the counterpart vehicle B or counterpart vehicle A falls within the peripheral vision of the driver, respectively. Here, as the vehicle A or the vehicle B approaches the intersection, the counterpart vehicle B or the counterpart vehicle A changes its position in the peripheral vision, respectively. Therefore, the driver of the vehicle A or vehicle B has a tendency of recognizing the vehicle B or the vehicle A, respectively.

Figure 4B:
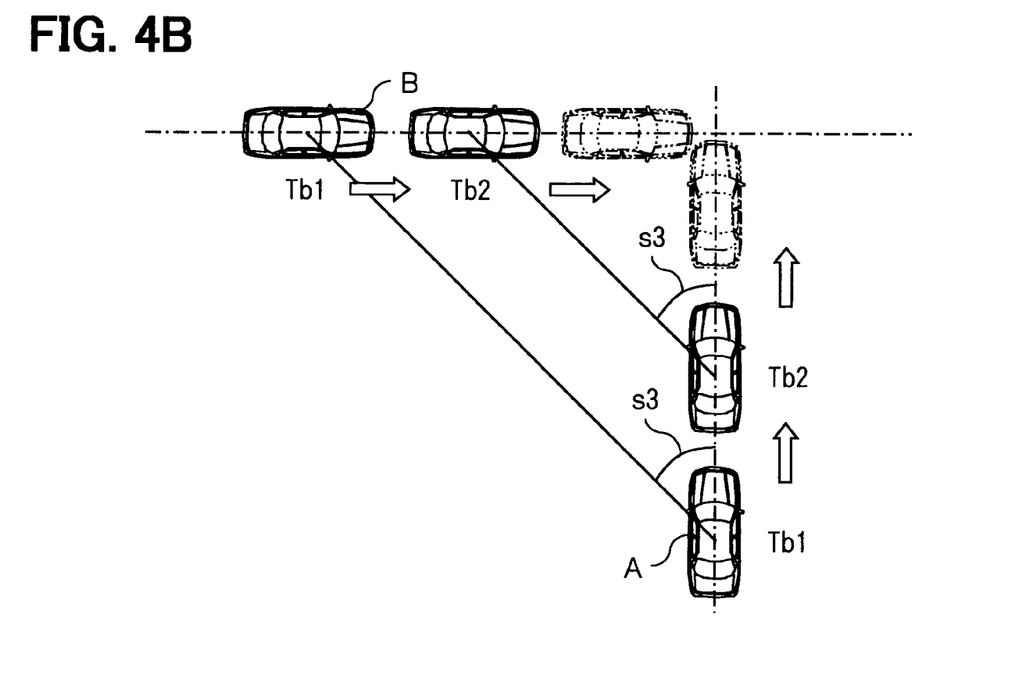
FIG. 4B is an imaginary view of a vehicle A and a vehicle B that are to enter an intersection and have approximately equal vehicle speeds to each other.

By contrast, FIG. 4B shows an imaginary view including an intersecting vehicle A and an intersecting vehicle B that are entering an intersection with approximately equal speeds. Here, relative positions between the two vehicles A, B at Ta1 and Ta2 almost remain the same. In other words, an orientation of the intersecting vehicle B relative to a traveling direction of the intersecting vehicle A almost remains at an orientation S3. Again, it is supposed that, while the driver of the vehicle A or vehicle B gazes forward at a traveling direction, the counterpart vehicle B or counterpart vehicle A falls within the peripheral vision of the driver, respectively. Here, even when the vehicle A or the vehicle B is approaching the intersection, the counterpart vehicle B or the counterpart vehicle A almost remains at its position in the peripheral vision, respectively. Therefore, the driver of the vehicle A or vehicle B has a tendency of not recognizing the vehicle B or the vehicle A, respectively.

Figure 5:
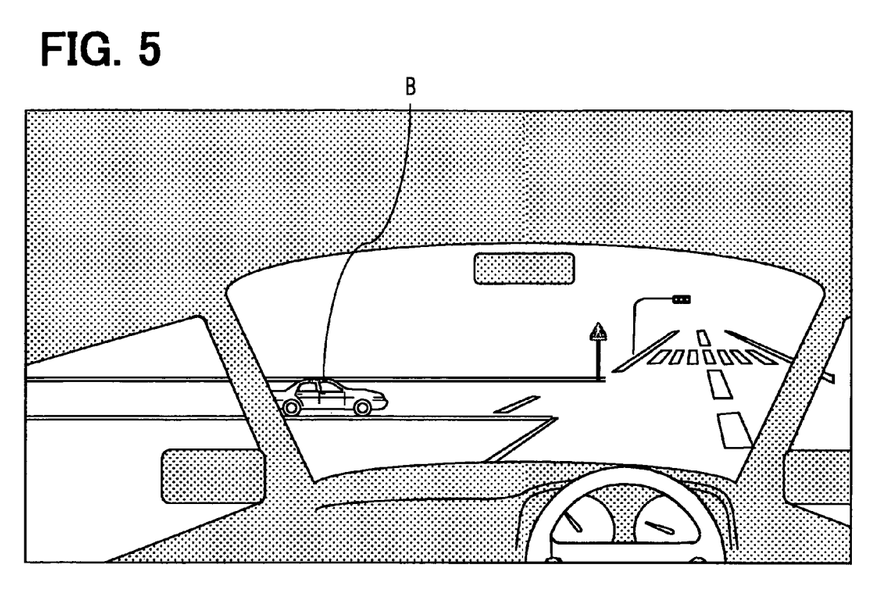
FIG. 5 is an imaginary view that a driver of a vehicle observes at time Tb1 while a driver gazes forward at its traveling direction.
Figure 6:
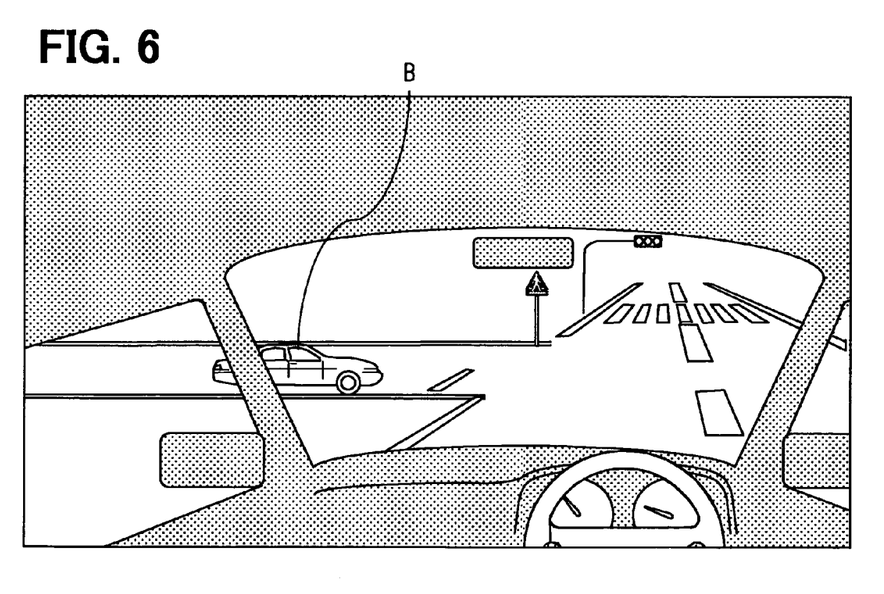
FIG. 6 is an imaginary view that a driver of a vehicle observes at time Tb2 while a driver gazes forward at its traveling direction.

FIG. 5 shows an imaginary view that the driver of the vehicle A observes at time Tb1 in FIG. 4B while the driver gazes forward at its traveling direction pays attention to a forward view. By contrast, FIG. 6 shows an imaginary view that the driver of the vehicle A observes at time Tb2 in FIG. 4B while the driver gazes forward at its traveling direction pays attention to a forward view. While the vehicle A and the vehicle B are entering the intersection at the approximately equal speeds, for the driver of the vehicle A, the size of the vehicle B is changed but the relative position of the vehicle B relative to the vehicle A is not changed. Therefore, the driver of the vehicle A eventually enters the intersection without recognizing the vehicle B that falls within the peripheral vision.

This intersecting vehicle whose relative position is not changed is also almost remains the same in its position within the image forward of the subject vehicle that is taken by the CCD camera 60. The collision possibility determining unit 83 thereby determines the possibility of a collision with a certain vehicle by, of the relative position determining unit 82, the determination result that the position of the certain vehicle continues to be not changing within the image for a given period, in addition to, of the traveling state determining unit 81, the determination result that its traveling state is proper.

The alarm generating unit 84 shown in FIG. 2 generates an alarm when receiving the determination result that the possibility of the collision with the certain vehicle exists. The driver of the subject vehicle can thereby execute an operation that prevents an collision with the certain vehicle from occurring.

The drive assisting device 200 of this embodiment determines collision possibility in undergoing a peculiar phenomenon that takes place in the above-mentioned clearly-viewed intersection. Namely, when a traveling state of a subject vehicle is proper, the collision possibility with a certain vehicle that looks almost stopping in a vision of the driver is determined by whether a relative position between the subject vehicle and the certain vehicle continues to be not changing for a given period. When the collision possibility is determined to be existing, a warning notice or an alarm arouses driver's attention is generated from the display unit 130 or the alarm unit 150.

Figure 7:
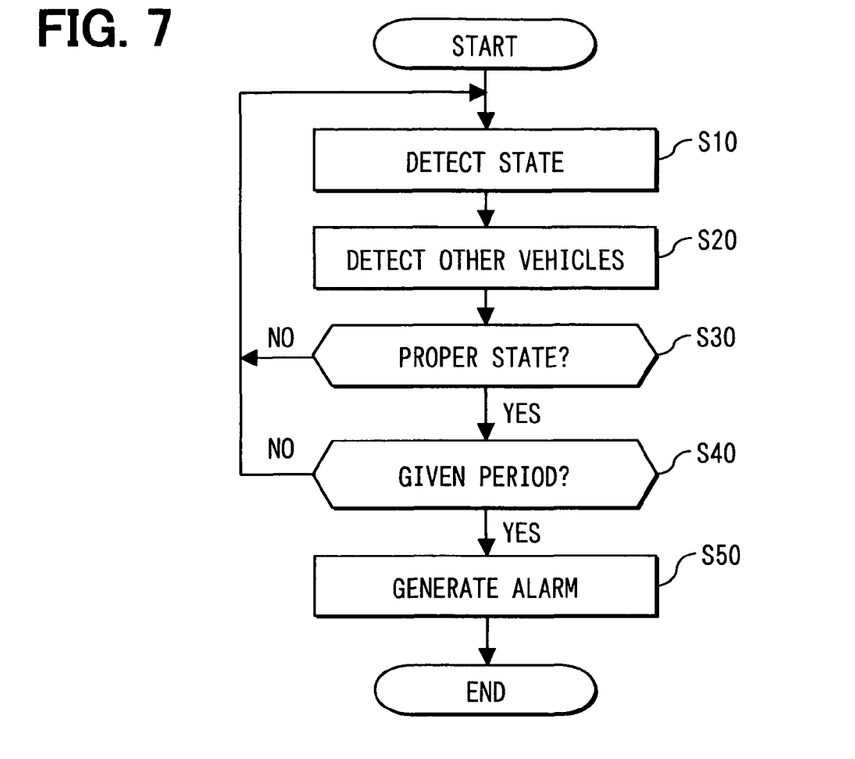
FIG. 7 is a flow chart diagram showing an alarm generating process of a drive assisting device according to the first embodiment.

An alarm generating process of a drive assisting device 200 mounted in a subject vehicle according to the first embodiment will be explained with reference to a flow chart diagram in FIG. 7. At S10 in FIG. 7, a following distance with a preceding vehicle and a traveling lane where a subject vehicle is traveling are detected. At S20, a position of a given vehicle such as an intersecting vehicle that is existing around the subject vehicle but that excludes the preceding vehicle is detected from an image taken by the CCD camera 60.

At S30, it is determined whether the subject vehicle maintains traveling within the traveling lane and a proper following period with the preceding vehicle or not, i.e., whether a traveling state of the subject vehicle is proper or not. Here, when this determination is affirmed, the process advances to S40. By contrast, when negated, the process returns to S10 for repeating the above.

At S40, it is determined whether a certain vehicle included in the given vehicle continues to almost maintain its position in the image for a given period. Here, when this determination is affirmed, the process advances to S50. By contrast, when negated, the process returns to S10 for repeating the above. At S50, since the collision possibility exists, a warning notice indicating the collision possibility is displayed from the display unit 130 or an alarm is generated from the alarm unit 150.

Thus, the drive assisting device 200 of this embodiment determines whether the collision possibility with a certain vehicle that looks almost stopping in a vision of the driver by whether a relative position between the subject vehicle and the certain vehicle continues to be not changing for a given period when a traveling state of the subject vehicle is proper. When the collision possibility is determined to be existing, an alarm or the like that arouses driver's attention is generated. This enables an alarm relating to an obstacle such as the certain vehicle to be generated at a proper timing even when other many vehicles are existing.

(Modification 1)

In the above, a relationship of a relative position with the subject vehicle is obtained by whether a certain vehicle continues to almost maintain its position in the image for a given period through detecting a position of the certain vehicle from an image taken by the CCD camera 60. However, for instance, through detecting an orientation of the certain vehicle relative to a traveling direction of the subject vehicle, the relationship of the relative position between the vehicles can be obtained by whether the certain vehicle continues to almost maintain its orientation for a given period. Detecting the orientation can be executed by the laser radar 30 using laser light or a radar unit using milli-meter waves, ultra-sonic waves, or the like.

Namely, as explained above, the certain vehicle that looks almost to be stopping in the driver's vision is continuously positioned to be in the same orientation. Therefore, determining whether the orientation of the certain vehicle relative to the traveling direction of the subject vehicle continues to be maintained results in determining whether the above-mentioned peculiar phenomenon takes place or not.

(Modification 2)

The alarm generating process of the above embodiment is executed when the traveling state is determined to be proper while the driver operates the subject vehicle. However, the alarm generating process can be executed also while a drive assisting process that assists a driving operation such as the lane keeping control or following distance control is executed.

While a drive assisting process such as the lane keeping control or following distance control is executed, a workload of the driver is relieved. It is thereby expected that attention of the driver to the periphery of the subject vehicle be reduced or scattered. This results in generating a tendency where the driver does not easily recognize existence of the certain vehicle that looks almost stopping within a peripheral vision of the driver. As a result, by executing an alarm generating process even while the drive assisting process, the driver can be effectively notified of the existence of the certain vehicle that looks almost stopping within the peripheral vision.

Second Embodiment

A second embodiment has a common part with the first embodiment, so that explanation to the common part is eliminated. The different part will be mainly explained below. A drive assisting device 200 of the second embodiment determines possibility of a collision with an oncoming vehicle that is positioned forward of a subject vehicle, generating an alarm or the like that arouses driver's attention when the collision possibility is determined to be existing.

Figure 8:
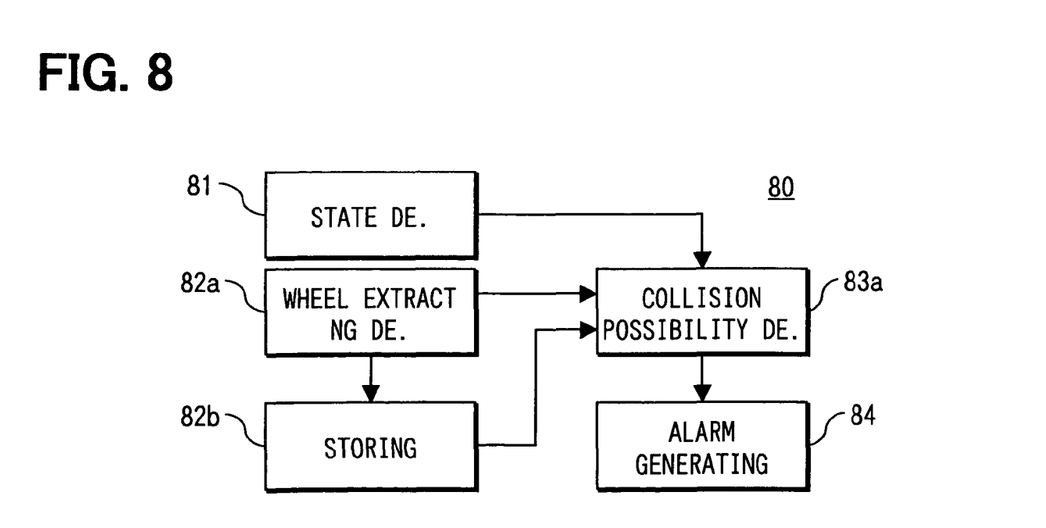
FIG. 8 is a block diagram showing control of a computer according to a second embodiment of the present invention.

In FIG. 8, a block diagram of control of the computer 80 is shown. Here, a traveling state determining unit 81 determines whether a traveling state of the subject vehicle is proper, i.e., whether the subject vehicle travels within a traveling lane and with a proper following time with a preceding vehicle. A result from the determination is sent to a collision possibility determining unit 83a every a given period (e.g., several hundred milli-seconds). This determination is executed based on a following distance or relative speed with the preceding vehicle detected by the laser radar sensor 30 and a lane that indicates a traveling division that is taken by the CCD camera 60.

A wheel extracting determining unit 82a determines, from an image taken by the CCD camera 60, whether a rear wheel of an oncoming vehicle that is ahead of the subject vehicle is extracted. For instance, a lane opposite to the traveling lane is detected. When an oncoming vehicle is then detected in the opposite lane, whether a rear wheel of the oncoming vehicle is extracted from the image is determined by whether the rear wheel is visible in the image. This determination result is then sent to a storing unit 82b and the collision possibility determining unit 83a. The determination result is accompanied by an identification number for identifying the oncoming vehicle.

Whether the rear wheel is visible in the image is determined based on whether an object having a shape (e.g., elliptic) indicating a wheel of the oncoming vehicle is shown in the image.

The storing unit 82b stores data of the determination result from the wheel extracting determining unit 82a with respect to the identification number accompanying the result. This enables storing the history of the determination result with respect to each of the oncoming vehicles.

The collision possibility determining unit 83a determines whether possibility of a collision with an oncoming vehicle exists or not based on the determination result relating to the traveling state of the subject vehicle from the traveling state determining unit 81 and the determination result from the wheel extracting determining unit 82a. Here, whether the collision possibility exists or not can be determined based on the history of the determination result of the wheel extracting determining unit 82a that is stored in the storing unit 82b.

Figure 9:
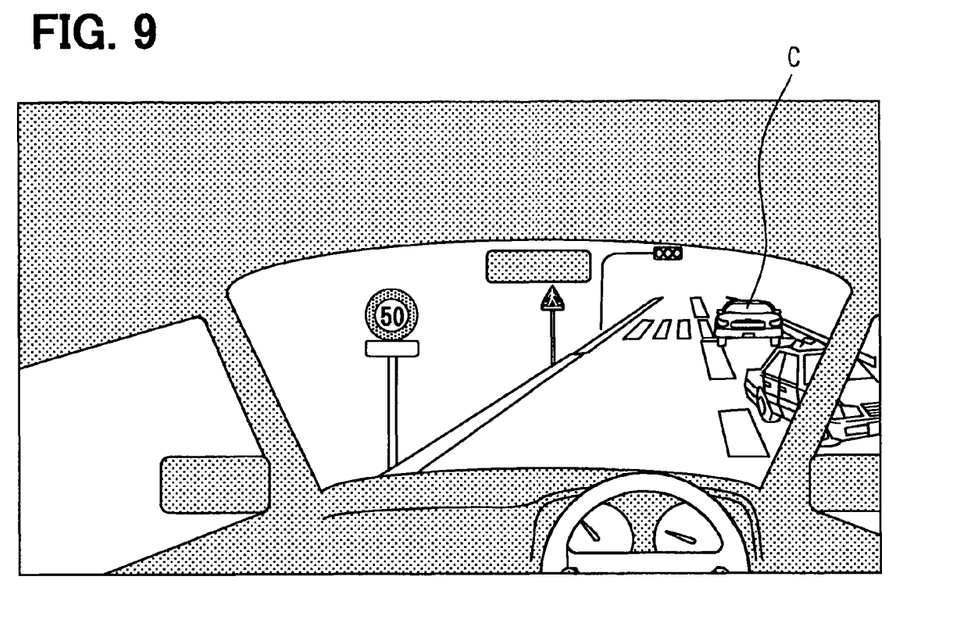
FIG. 9 is an imaginary view of an oncoming vehicle in an opposite lane that is observed from a subject vehicle according to the second embodiment.

Here, the rear wheel of the oncoming vehicle can be seen when the oncoming vehicle properly travels at the traveling direction in the opposite lane. Therefore, when a rear wheel is visible, the wheel extracting determining unit 82a determines that the rear wheel is extracted. In contrast, when an oncoming vehicle (e.g., vehicle C in FIG. 9) deviates from its traveling lane to approach towards the subject vehicle, a rear wheel that was visible in the image becomes invisible in the image. This causes the wheel extracting determining unit 82a to determine that the rear wheel of the oncoming vehicle is not extracted. However, when the oncoming vehicle temporarily deviates from its traveling lane to avoid an obstacle or the like, its rear wheel that was visible in the image also becomes invisible in the image.

Therefore, the collision possibility determining unit 83a determines that possibility of a collision between the subject vehicle and the oncoming vehicle exists when three determinations are affirmed. Namely, the first determination is by the traveling state determining unit 81 that the traveling state of the subject vehicle is proper. The second determination is by the wheel extracting determining unit 82*a* that the rear wheel of the oncoming vehicle is visible. The third determination is that the history of the determination result stored in the storing unit 82*b* exhibits that the rear wheel is continuously extracted for a given period. This prevents the determination that possibility of a collision with an oncoming vehicle exists, when an oncoming vehicle temporarily deviates from its traveling lane to avoid an obstacle.

The alarm generating unit 84 generates an alarm when receiving, from the collision possibility determining unit 83*a*, the determination result that the possibility of the collision with the oncoming vehicle exists. This enables the driver of the subject vehicle to execute an operation that prevents a collision with the oncoming vehicle from occurring.

Figure 10:
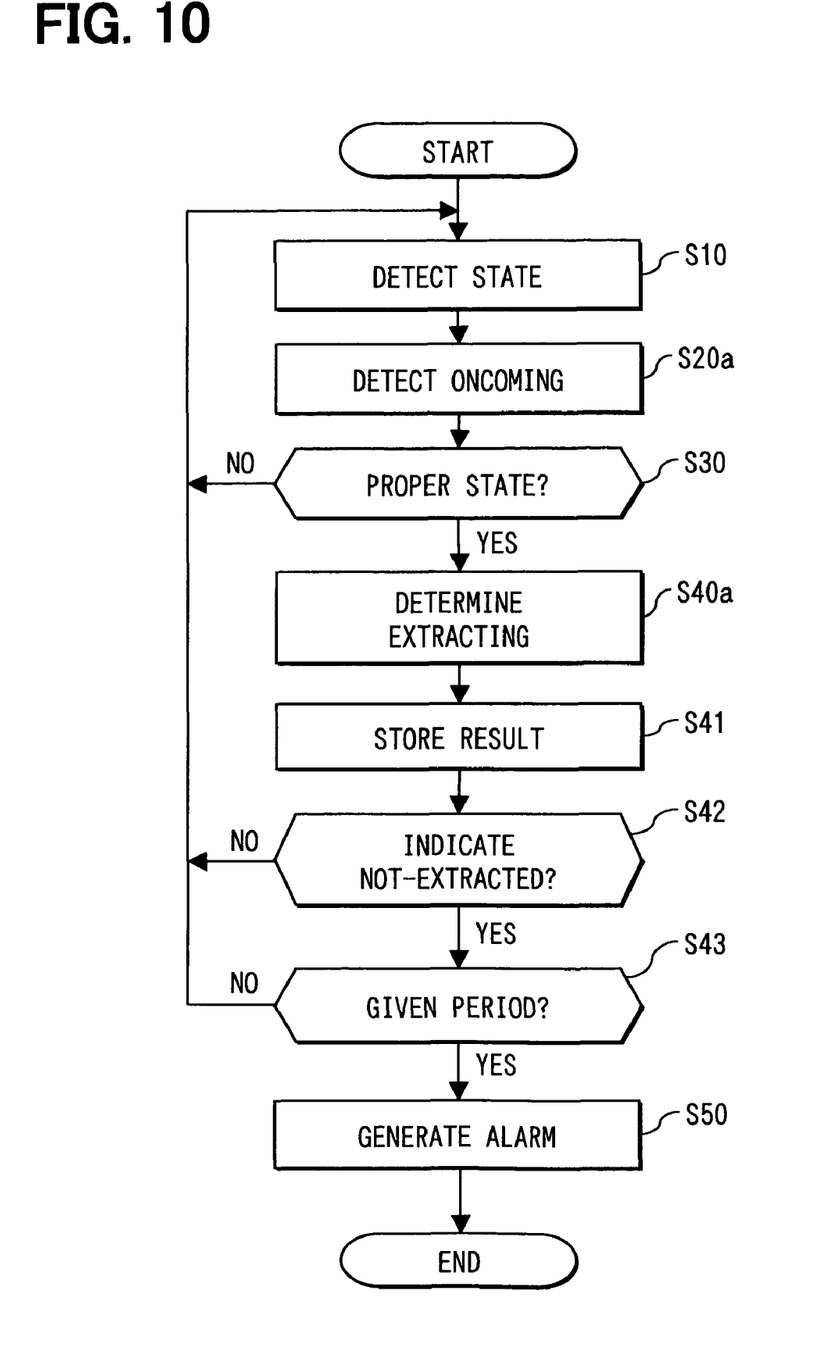
FIG. 10 is a flow chart diagram showing an alarm generating process of a drive assisting device according to the second embodiment.

An alarm generating process of a drive assisting device 200 mounted in a subject vehicle according to the second embodiment will be explained with reference to a flow chart diagram in FIG. 10. At S10 in FIG. 10, a following distance with a preceding vehicle and a traveling lane where a subject vehicle is traveling are detected. At S20*a*, a lane opposite to the traveling lane of the subject vehicle and then an oncoming vehicle that exists in the opposite lane are detected from an image taken by the CCD camera 60.

At S30, it is determined whether the subject vehicle maintains traveling within the traveling lane and a proper following period with the preceding vehicle or not, i.e., whether a traveling state of the subject vehicle is proper or not. Here, when this determination is affirmed, the process advances to S40*a*. By contrast, when negated, the process returns to S10 for repeating the above.

At S40*a*, it is determined whether a rear wheel of the oncoming vehicle is extracted. At S41, the determination result at S40*a* is stored in the storing unit 82*a* along with an identification number of the oncoming vehicle. At S42, it is determined whether the stored determination result indicates that a rear wheel is not extracted. Here, when this determination is affirmed, the process advances to S43. By contrast, when negated, the process returns to S10 for repeating the above.

At S43, it is determined whether the rear wheel of the oncoming vehicle having the same identification number is continuously not extracted for a given period or more. Here, when this determination is affirmed, the process advances to S50. By contrast, when negated, the process returns to S10 for repeating the above. At S50, since the collision possibility exists, a warning notice indicating the collision possibility is displayed from the display unit 130 or an alarm is generated from the alarm unit 150.

Thus, the drive assisting device 200 of the second embodiment determines whether collision possibility between the subject vehicle and the oncoming vehicle exists based on whether the rear wheel of the oncoming vehicle is extracted from the image. This enables the drive assisting device 200 to determine whether collision possibility between the subject vehicle and the oncoming vehicle exists without obtaining data such as a distance to the oncoming vehicle, an orientation or size of the oncoming vehicle, or the like.

(Modification 3)

In the above, whether a rear wheel of an oncoming vehicle is extracted is determined from an image taken by the CCD camera 60. However, for instance, it can be also determined by the laser radar 30 using laser light.

For instance, when the laser light is radiated to an oncoming vehicle having an aluminum-made wheel, a reflection strength from the wheel is higher than that from the body. Therefore, a reflection strength from a wheel is previously memorized when the laser light is radiated to the wheel; then, it is determined that a rear wheel of an oncoming vehicle is extracted when the reflection strength from the oncoming vehicle is approximately equal to the memorized strength, (Modification 4)

The alarm generating process of the above embodiment is executed when the traveling state is determined to be proper while the driver operates the subject vehicle. However, the alarm generating process can be executed also while a drive assisting process that assists a driving operation such as the lane keeping control or following distance control is executed.

Namely, while a drive assisting process such as the lane keeping control or following distance control is executed, a workload of the driver is relieved. It is thereby expected that attention of the driver to the periphery of the subject vehicle be reduced or scattered. This results in generating a tendency where the driver does not easily recognize existence of an oncoming vehicle that is approaching to the subject vehicle. As a result, by executing an alarm generating process even while the drive assisting process, the driver can be effectively notified of the existence of the oncoming vehicle that is approaching to the subject vehicle.

It will be obvious to those skilled in the art that various changes may be made in the above-described embodiments of the present invention. However, the scope of the present invention should be determined by the following claims.

What is claimed is:

1. A collision possibility determining device mounted in a subject vehicle comprising:

a traveling state determining unit configured to determine whether a traveling state of the subject vehicle is proper or not based on at least one of a position of the subject vehicle in a vehicle-width direction within a traveling lane and a relative relationship with a preceding vehicle;

an oncoming vehicle detecting unit configured to detect an oncoming vehicle that is positioned forward of the subject vehicle and travels in a lane opposite to the traveling lane of the subject vehicle;

an extracting determining unit configured to determine whether a portion constituting a side of the oncoming vehicle is extracted from a result detected by the oncoming vehicle detecting unit, the portion constituting the side of the oncoming vehicle including a rear wheel of the oncoming vehicle; and a collision possibility determining unit configured to determine, when the traveling state of the subject vehicle is determined to be proper, whether possibility of a collision between the subject vehicle and the oncoming vehicle exists based on a result determined by the extracting determining unit.

2. The collision possibility determining device of claim 1, the oncoming vehicle detecting unit is configured to include an imaging unit that takes an image covering a range forward of the subject vehicle, and the extracting determining unit is configured to determine whether a rear wheel of the oncoming vehicle is extracted as the portion constituting the side of the oncoming vehicle from the image taken by the imaging unit.

3. The collision possibility determining device of claim 1, further comprising:

a storing unit configured to store a result determined by the extracting determining unit while correlating the result with the oncoming vehicle, the collision possibility determining unit being further configured to determine, when the portion constituting the side of the oncoming vehicle is determined to be not extracted, whether the possibility of the collision between the subject vehicle and the oncoming vehicle exists based on a history of the result stored in the storing unit.

4. The collision possibility determining device of claim 3, the collision possibility determining unit being further configured to obtain, when the portion constituting the side of the oncoming vehicle is determined to be not extracted, the history up to when the portion constituting the side of the oncoming vehicle is determined to be not extracted, and the collision possibility determining unit is further configured to determine that the possibility of the collision between the subject vehicle and the oncoming vehicle exists when the obtained history continuously exhibits that the portion constituting the side of the oncoming vehicle is determined to be not extracted for a given period or more.

5. The collision possibility determining device of claim 4, further comprising:

a warning generating unit configured to generate a warning when the possibility of the collision between the subject vehicle and the oncoming vehicle is determined to be existing.

6. The collision possibility determining device of claim 1, further comprising:

a lane keeping control unit configured to control the subject vehicle in such a manner that the subject vehicle travels while maintaining the position of the subject vehicle in the vehicle-width direction within the traveling lane; and a following distance control unit configured to control the subject vehicle in such a manner that the subject vehicle travels while maintaining a given following distance to the preceding vehicle based on the relative relationship of the preceding vehicle;

the traveling state determining unit is configured to determine that the traveling state of the subject vehicle is proper when the traveling state is properly controlled by at least one of the lane keeping control unit and the following distance control unit, and the collision possibility determining unit is configured to thereby determine whether the possibility of the collision exists.

7. The collision possibility determining device of claim 1, the collision possibility determining unit being configured to determine whether possibility of the collision between the subject vehicle and the oncoming vehicle exists when the portion constituting the side of the oncoming vehicle has not been extracted for at least a pre-determined period.

8. The collision possibility determining device of claim 1, the collision possibility determining unit being configured to determine, when the traveling state of the subject vehicle is determined to be proper and the oncoming vehicle detecting unit detects the oncoming vehicle, that the possibility of a collision exists when the result determined by the extracting determining unit determines that the side of the oncoming vehicle is not extracted, and that the possibility of the collision does not exist when the result determines that the side of the oncoming vehicle is extracted.

9. A collision possibility determining device mounted in a subject vehicle comprising:

a traveling state determining unit configured to determine whether a traveling state of the subject vehicle is proper or not based on at least one of a position of the subject vehicle in a vehicle-width direction within a traveling lane and a relative relationship with a preceding vehicle;

an oncoming vehicle detecting unit configured to detect an oncoming vehicle that is positioned forward of the subject vehicle and travels in a lane opposite to the traveling lane of the subject vehicle;

an extracting determining unit configured to determine whether a portion constituting a side of the oncoming vehicle is extracted from a result detected by the oncoming vehicle detecting unit; and a collision possibility determining unit configured to determine, when the traveling state of the subject vehicle is determined to be proper, that a possibility of a collision between the subject vehicle and the oncoming vehicle exists based on a comparison of results determined by the extracting determining unit over time which show that a rear wheel that was previously visible in the portion constituting the side of the oncoming vehicle becomes invisible although the oncoming vehicle is still visible, the extracting determining unit further is configured to determine whether or not the rear wheel of the oncoming vehicle is extracted as the portion constituting the side of the oncoming vehicle.

10. The collision possibility determining device of claim 9, the oncoming vehicle detecting unit is configured to include an imaging unit that takes an image covering a range forward of the subject vehicle, and the extracting determining unit is configured to determine whether the rear wheel of the oncoming vehicle is extracted as the portion constituting the side of the oncoming vehicle from the image taken by the imaging unit.

11. The collision possibility determining device of claim 9, further comprising:

a storing unit configured to store a result determined by the extracting determining unit while correlating the result with the oncoming vehicle, the collision possibility determining unit being further configured to determine, when the portion constituting the side of the oncoming vehicle is determined to be not extracted, whether the possibility of the collision between the subject vehicle and the oncoming vehicle exists based on a history of the result stored in the storing unit.

12. The collision possibility determining device of claim 11, the collision possibility determining unit being further configured to obtain, when the portion constituting the side of the oncoming vehicle is determined to be not extracted, the history up to when the portion constituting the side of the oncoming vehicle is determined to be not extracted, and the collision possibility determining unit is further configured to determine that the possibility of the collision between the subject vehicle and the oncoming vehicle exists when the obtained history continuously exhibits that the portion constituting the side of the oncoming vehicle is determined to be not extracted for a given period or more.

13. The collision possibility determining device of claim 12, further comprising:

a warning generating unit configured to generate a warning when the possibility of the collision between the subject vehicle and the oncoming vehicle is determined to be existing.

14. The collision possibility determining device of claim 9, further comprising:
  a lane keeping control unit configured to control the subject vehicle in such a manner that the subject vehicle travels while maintaining the position of the subject vehicle in the vehicle-width direction within the traveling lane; and
  a following distance control unit configured to control the subject vehicle in such a manner that the subject vehicle travels while maintaining a given following distance to the preceding vehicle based on the relative relationship of the preceding vehicle;
  the traveling state determining unit is configured to determine that the traveling state of the subject vehicle is proper when the traveling state is properly controlled by at least one of the lane keeping control unit and the following distance control unit, and
  the collision possibility determining unit is configured to thereby determine whether the possibility of the collision exists.

15. The collision possibility determining device of claim 9, the collision possibility determining unit being configured to determine whether possibility of the collision between the subject vehicle and the oncoming vehicle exists when the portion constituting the side of the oncoming vehicle has not been extracted for at least a pre-determined period.

16. The collision possibility determining device of claim 9, the collision possibility determining unit being configured to determine, when the traveling state of the subject vehicle is determined to be proper and the oncoming vehicle detecting unit detects the oncoming vehicle, that the possibility of a collision exists when the result determined by the extracting determining unit determines that the side of the oncoming vehicle is not extracted, and that the possibility of the collision does not exist when the result determines that the side of the oncoming vehicle is extracted.

17. A collision possibility determining device mounted in a subject vehicle comprising:
  a traveling state determining unit configured to determine whether a traveling state of the subject vehicle is proper or not based on at least one of a position of the subject vehicle in a vehicle-width direction within a traveling lane and a relative relationship with a preceding vehicle;
  an oncoming vehicle detecting unit configured to detect an oncoming vehicle that is positioned forward of the subject vehicle and travels in a lane opposite to the traveling lane of the subject vehicle;
  an extracting determining unit configured to determine whether a portion constituting a side of the oncoming vehicle is extracted from a result detected by the oncoming vehicle detecting unit;
  a collision possibility determining unit configured to determine, when the traveling state of the subject vehicle is determined to be proper, that a possibility of a collision between the subject vehicle and the oncoming vehicle exists based on a comparison of results determined by the extracting determining unit over time which show that a rear wheel that was previously visible in the portion constituting the side of the oncoming vehicle becomes invisible although the oncoming vehicle is still detected; and
  a storing unit configured to store a result determined by the extracting determining unit while correlating the result with the oncoming vehicle,
  the extracting determining unit further is configured to determine whether or not the rear wheel of the oncoming vehicle is extracted as the portion constituting the side of the oncoming vehicle,
  the oncoming vehicle detecting unit further is configured to include an imaging unit that takes an image covering a range forward of the subject vehicle,
  the extracting determining unit further is configured to determine whether the rear wheel of the oncoming vehicle is extracted as the portion constituting the side of the oncoming vehicle from the image taken by the imaging unit,
  the collision possibility determining unit further is configured to determine, when the portion constituting the side of the oncoming vehicle is determined to be not extracted, whether the possibility of the collision between the subject vehicle and the oncoming vehicle exists based on a history of the result stored in the storing unit,
  the collision possibility determining unit further is configured to obtain, when the portion constituting the side of the oncoming vehicle is determined to be not extracted, the history up to when the portion constituting the side of the oncoming vehicle is determined to be not extracted,
  the collision possibility determining unit further is configured to determine that the possibility of the collision between the subject vehicle and the oncoming vehicle exists when the obtained history continuously exhibits that the portion constituting the side of the oncoming vehicle is determined to be not extracted for at least a pre-determined period, and
  the collision possibility determining unit further is configured to determine, when the traveling state of the subject vehicle is determined to be proper and the oncoming vehicle detecting unit detects the oncoming vehicle, that the possibility of the collision does not exist when the result determines that the side of the oncoming vehicle is extracted.

18. The collision possibility determining device of claim 17, further comprising:
  a lane keeping control unit configured to control the subject vehicle in such a manner that the subject vehicle travels while maintaining the position of the subject vehicle in the vehicle-width direction within the traveling lane; and
  a following distance control unit configured to control the subject vehicle in such a manner that the subject vehicle travels while maintaining a given following distance to the preceding vehicle based on the relative relationship of the preceding vehicle;
  the traveling state determining unit is configured to determine that the traveling state of the subject vehicle is proper when the traveling state is properly controlled by at least one of the lane keeping control unit and the following distance control unit, and
  the collision possibility determining unit is configured to thereby determine whether the possibility of the collision exists.

* * * * *